United States Patent [19]
Schuplin

[11] 3,780,209
[45] Dec. 18, 1973

[54] CLIP FOR SECURING CONDUIT BOXES TO METAL DRY WALL STUDS

[75] Inventor: Jerome T. Schuplin, Parma Heights, Ohio

[73] Assignee: Fastway Fasteners, Inc., Lorain, Ohio

[22] Filed: Sept. 27, 1972

[21] Appl. No.: 292,813

[52] U.S. Cl. .................. 174/51, 24/81 B, 174/58, 220/3.9, 248/205 R, 248/229, 248/DIG. 6, 287/189.35
[51] Int. Cl. .......................... H02g 3/08, F16b 2/24
[58] Field of Search ................ 174/51, 58; 24/73 B, 24/81 B; 220/3.9; 248/72, 205 R, 223, 226 E, 228, 229, 300, DIG. 6; 287/189.35

[56] References Cited
UNITED STATES PATENTS

| | | | |
|---|---|---|---|
| 3,122,604 | 2/1964 | Cook et al. | 174/51 |
| 3,131,447 | 5/1964 | Tinnerman | 24/81 B |
| 3,528,636 | 9/1970 | Schmidt | 248/205 R |
| 3,536,281 | 10/1970 | Meehan et al. | 248/223 X |
| 3,588,019 | 9/1971 | Cozeck et al. | 248/205 R X |
| 3,606,223 | 9/1971 | Havener | 248/205 R |
| 3,684,230 | 8/1972 | Swanquist | 248/229 |

Primary Examiner—Laramie E. Askin
Attorney—Islera & Ornstein

[57] ABSTRACT

A one-piece clip is provided which can be quickly and easily secured to the flange of a channel stud and to a conduit box without the aid of fastening means other than that which is an integral part of the clip. The clip is provided with barbs or prongs which engage the web and flange lip of the stud for preventing displacement of the clip relatively to the stud and box. A feature of the invention is the provision of means formed integrally with the clip for the securement to the clip of the ground wire of a three wire system, as well as means in the clip for receiving a screwdriver or the like for the purpose of biasing portions of the clip away from other portions, whereby to facilitate attachment of the clip to the stud and box.

17 Claims, 9 Drawing Figures

CLIP FOR SECURING CONDUIT BOXES TO METAL DRY WALL STUDS

This invention relates generally to clips for securing conduit boxes to metal dry wall studs, but has reference more particularly to clips of the type disclosed in my co-pending patent application, Ser. No. 172,842, filed Aug. 18, 1971 now U.S. Pat. No. 3,720,395.

The clip of the aforesaid application is characterized by the provision of a first portion which is adapted to be clamped to the side wall of an electrical conduit or outlet box, and a second portion which is adapted for clamped engagement with the web, flange and lip of the stud.

In building construction in which such conduit boxes, metal studs and clips are utilized, electrical codes require a three wire system, with one of the wires grounded to the conduit box. Such grounding is usually accomplished by using a short wire which is screwed to the conduit box or to a grounding clip which grips the wire and is attached to the box.

The present invention has as one of its primary objects the provision of a clip of the character disclosed in my aforesaid pending application, but having improved features which enable the clip to be more firmly secured or attached to the metal stud.

Another object of the invention is to provide a clip of the character described having means incorporated therein for securing a ground wire to the clip, thereby eliminating extra lengths of wire, screws and extra clips, such as commonly used for grounding purposes.

A further object of the invention is to provide a clip of the character described having auxiliary means for securing the clip to the metal stud, whereby to insure that the conduit box and clip cannot be removed accidentally from the metal stud, as by workmen passing through spaces between adjacent studs.

A further object of the invention is to provide a clip of the character described which has added versatility in that it may be used in several different ways to secure the conduit box to a metal stud.

A still further object of the invention is to provide a clip of the character described having means incorporated therein for enabling the clip to be manipulated by a screw driver for the purpose of assisting in securing the clip to the conduit box and metal stud.

Other objects and advantages of my invention will be apparent during the course of the following description.

In the accompanying drawings forming a part of this specification, and in which like numerals are employed to designate like parts throughout the same, FIG. 1 is a side elevational view of a clip embodying the invention;

Figure 1:
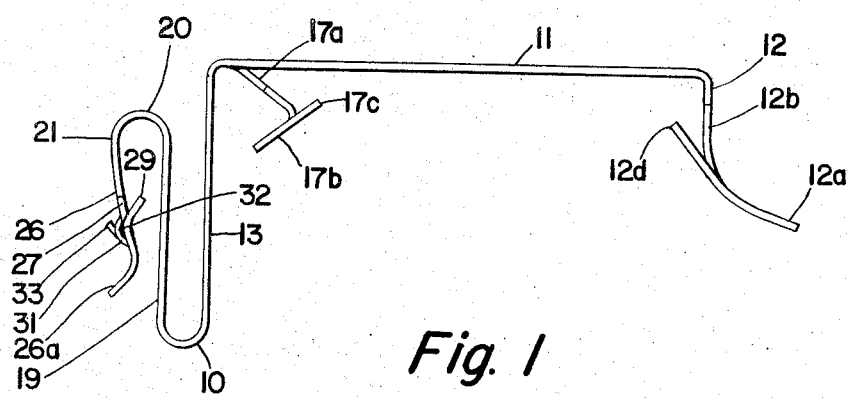
Figure 2:
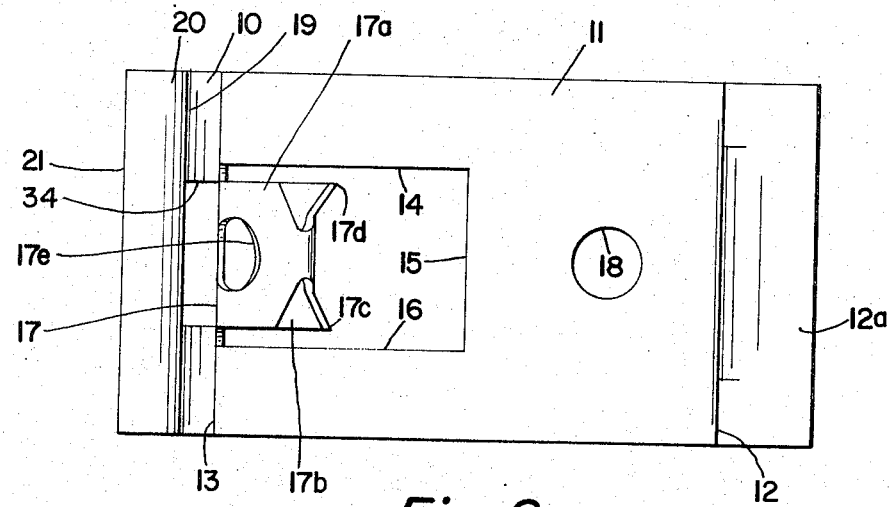
FIG. 2 is a top plan view of the clip.
Figure 3:
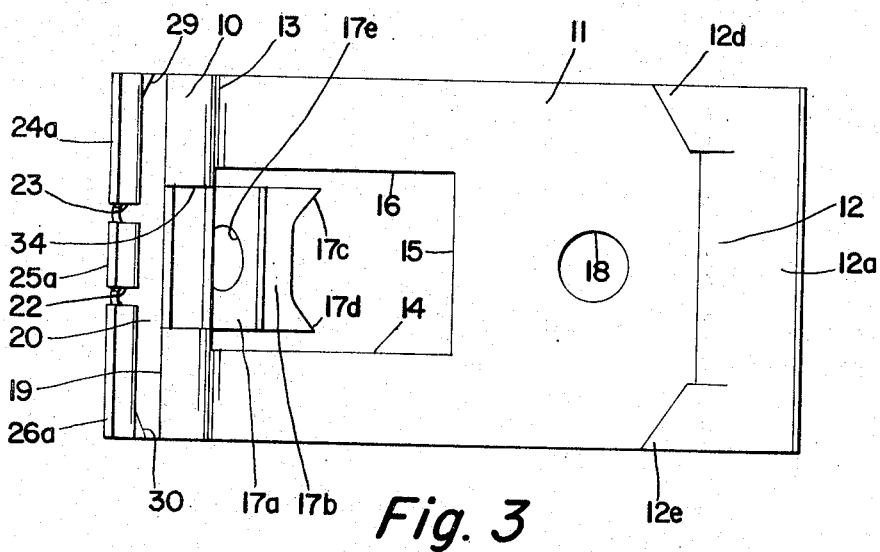
FIG. 3 is a bottom plan view of the clip.
Figure 4:
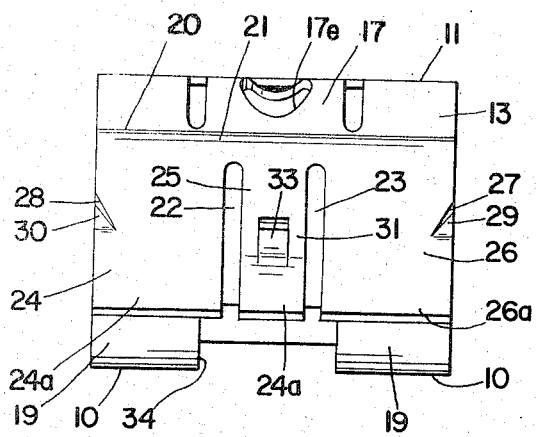
FIG. 4 is an end elevational view of the clip, as viewed from the left end of FIG. 1.
Figure 5:
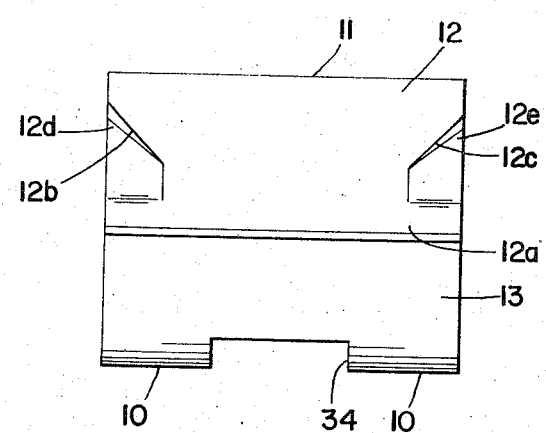
FIG. 5 is an end elevational view of the clip, as viewed from the right end of FIG. 1.
Figure 7:
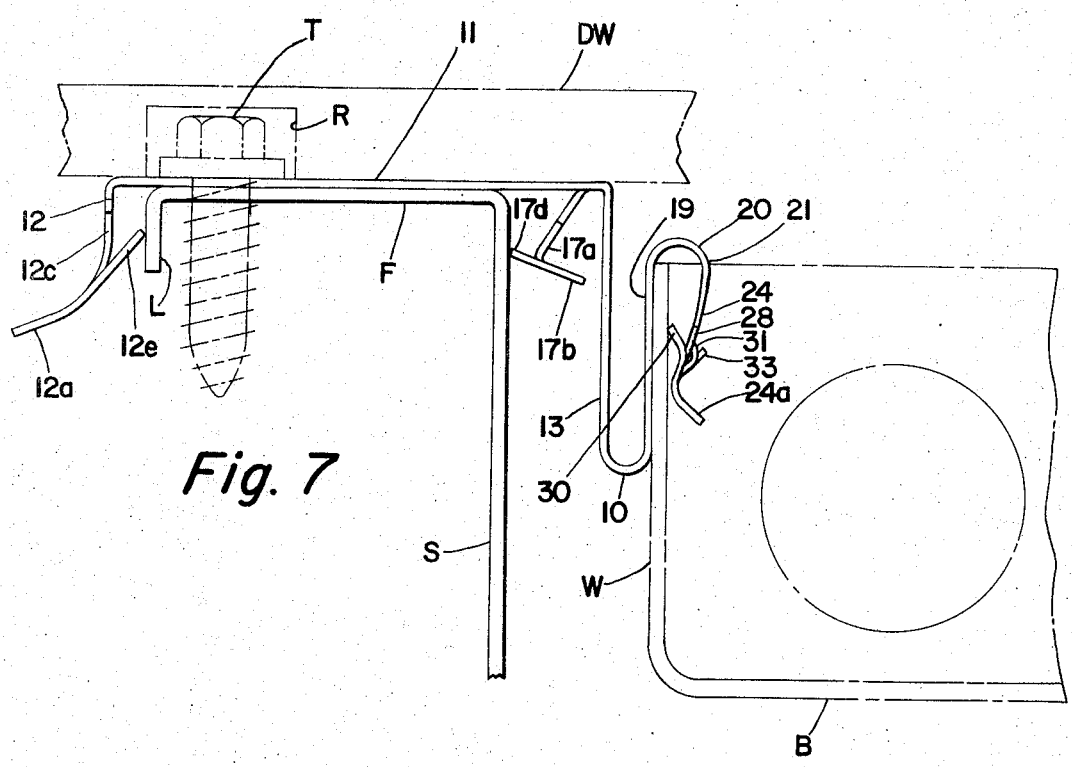
FIG. 7 is a view showing the manner in which the clip is attached to a conduit box and one way in which the clip is attached to the stud.

Referring more particularly to FIGS. 1 and 7 inclusive of the drawings, the clip is made from a rectangular blank of sheet metal or metal strip, preferably heat-treated and spring-tempered steel, which is bent, as at 10, to provide a portion which is adapted for securement to the flange F of a channel stud S (see FIG. 7) and a portion which is adapted for securement to the side wall W of an electrical conduit or outlet box B (see FIG. 7).

The portion of the clip which is adapted for securement to the flange F of the stud S comprises a flat body 11 having at one end a downturned flange 12 which terminates in a curved end or lip 12a, which is sheared along oblique lines 12b and 12c (FIGS. 1, 5, 6 and 7) to provide areas which are bent inwardly out of the plane of the flange 12 to form barbs or prongs 12d and 12e, which serve a purpose to be presently described.

The body 11 has at its other end a downturned flange 13 which extends below the lower level of the flange 12-12a and terminates at the bend 10.

The body 11 is sheared along lines 14, 15 and 16 to provide an ear having a portion 17 which extends upwardly from the flange 13 to the level of the body 11, a portion 17a which extends downwardly into the space between the flanges 12 and 13, at an angle of approximately 60° to the flange 13, and a portion 17b which extends at an angle of approximately 90° to the portion 17a, and is provided at its upper corners with barbs or prongs 17c and 17d which serve a purpose to be presently described.

An opening 17e is provided at the junction between the portions 17 and 17a of the ear, which opening serves a purpose to be presently described.

The body 11 of the clip is also provided with a circular hole 18, the function of which will hereinafter be described.

The portion of the clip which is adapted for securement to the side wall of the conduit box B comprises a flange 19 which extends upwardly from the bend 10 in substantially parallel relation to the flange 13, and is rebent as at 20 to provide a downwardly extending flange 21, which extends at an angle inwardly towards the flange 19.

The flange 21 is divided, as by slots 22 and 23, into three parts 24, 25 and 26, which terminate respectively in outwardly curved ends or lips 24a, 25a and 26a.

The parts 24 and 26 are sheared along oblique lines 27 and 28 (see FIGS. 1, 3, 4, 6 and 7) to provide areas which are bent inwardly out of the plane of the parts 24 and 26 to form barbs or prongs 29 and 30, which serve a purpose to be presently described.

The part 25 of the flange 21 is provided with a central portion 31, which is bent outwardly from the plane of the part 25 to form a concave wall or recess 32 (see FIGS. 1, 4, 6 and 7), which serves a purpose to be presently described.

A portion of the part 25 adjacent this central portion 31 is sheared to provide an area which is bent outwardly, as in FIGS. 1, 4, 6 and 7, to form an ear or tab 33, whose function will be described.

A portion of the bent area 10 is removed to provide an opening 34 (see FIGS. 2, 3, 4 and 5), which serves a purpose to be presently described.

In FIG. 7, the dry wall to which the stud S is secured is indicated by reference letters DW, and the lip of the flange F of the stud by reference letter L.

The clip is installed in a manner which will now be described, with particular reference to FIG. 7.

The flanges 19 and 21 are secured to the side wall W of the conduit box by means of a hammer or pliers in the position shown in FIG. 7. This securement is facilitated by reason of the provision of the curved ends 24a, 25a and 26a. In thus securing the clip to the wall W, the parts 24, 25 and 26 are biased from the wall slightly away from the flange 19, and when the clip is in the position shown in FIG. 7, the tendency of the parts 24 and 26 to return to their unbiased position causes the barbs or prongs 29 and 30 to bite into the inner surface of the wall W, so that the prongs function to prevent displacement of the clip from the wall W.

The clip and its attached conduit box are then properly positioned longitudinally with reference to the stud, after which, while holding the conduit box in one hand, the clip may be applied to the stud to the position shown in FIG. 7. This is done by first applying the barbs or prongs 17c and 17d against the exterior surface of the web of the stud, and then rocking the clip to a position such that the barbs or prongs 12d and 12e engage and bite into the exterior surface of the lip L of the flange F.

If the stud is solidly in place, a hammer may be used to thus secure the clip to the stud.

If, however, the stud is not solidly secured in place, or insufficiently secured in place, to permit or warrant the use of a hammer, a screwdriver may be used to secure the clip to the stud. For this purpose, a screwdriver is inserted in the space between the flanges 13 and 19 of the clip, and through the opening 34. The screwdriver is then pressed against the flange 13 with sufficient force to enable the flange 12 to be slipped over the lip L of the stud by the thumb of the hand.

While the screwdriver is still in the position described, it may be used to pry the barbs or prongs 17c and 17d away from the stud, so as to permit the clip to be moved to the position shown in FIG. 7, to thereby properly set the barbs, for maximum gripping action of these barbs as well as the barbs 12d and 12e.

In this connection, it may be noted that a screwdriver may be inserted through the opening 17e, and leverage applied thereby against the portion 17a of the ear, to thereby move the barbs or prongs 17c and 17d away from the web of the stud S, for the purpose of shifting or adjusting the position of the clip relatively to the stud.

Although the barbs 12d, 12e, 17c and 17d have sufficient resiliency and gripping power to secure the clip to the stud, under virtually all conditions, it is desirable, in some instances, as during building construction while workmen are passing through the spaces between studs, to provide additional protection against displacement of the clips, in such instances.

For this purpose, or additional security, a screw, such as shown at T in FIG. 7 may be driven through the hole 18 in the clip, and into the flange F of the stud. This screw may be a hex head screw or a flat head screw. If the screw is a hex head screw, as shown in FIG. 7, the dry wall DW is provided with a recess R for reception of the head of the screw. If the screw is a flat head screw, the recess R would not be required, since a slight rap with a hammer would cause the head of the screw to sink into the soft cardboard back of the dry wall.

Figure 6:
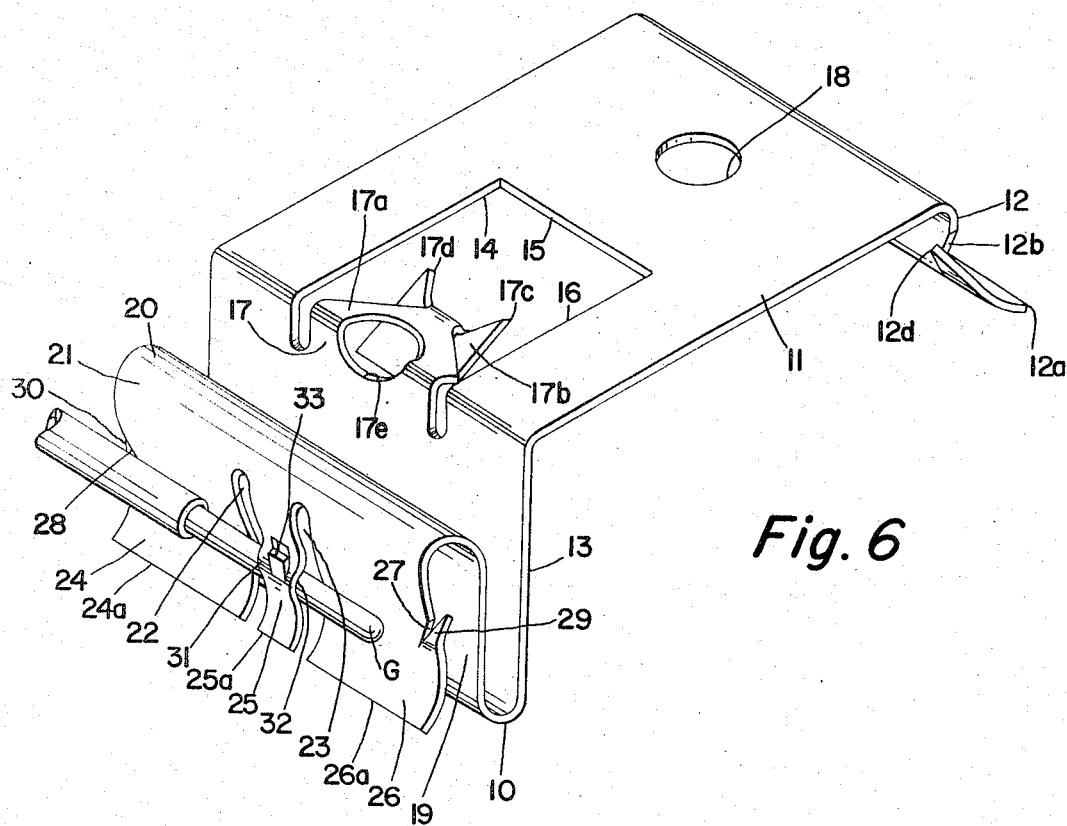
FIG. 6 is a perspective view of the clip, which also shows the manner in which a ground wire is secured to the clip.

Referring more particularly to FIG. 6, reference numeral G designates the ground wire of a three wire system which electrical building codes require be fastened to the conduit or outlet box B.

The wire G in this instance is resiliently clamped to the portions 24 and 26 of the flange 21 of the clip by means of the central portion 31 of the portion 25 of the flange, so that the wire is grounded to the outlet box through the clip itself. In thus securing the wire to the clip, a screwdriver is inserted into the space between the ear or tab 33 and the wall of the part 25 behind this tab, and leverage applied to the part 25 to pry the latter away from the parts 24 and 26, permitting the wire G to be inserted through the portion 31, and moved to the position shown, after which the portion 25 is permitted to return to its clamping position.

It may also be noted that the ear or tab 33 may also be engaged by a screwdriver as a means of prying the flange 21 away from the flange 19, to thereby aid in initially securing the clip to a conduit box, or as a means of disengaging the barbs 29 and 30 from the conduit box, in the event the clip is to be removed from the box.

Figure 8:
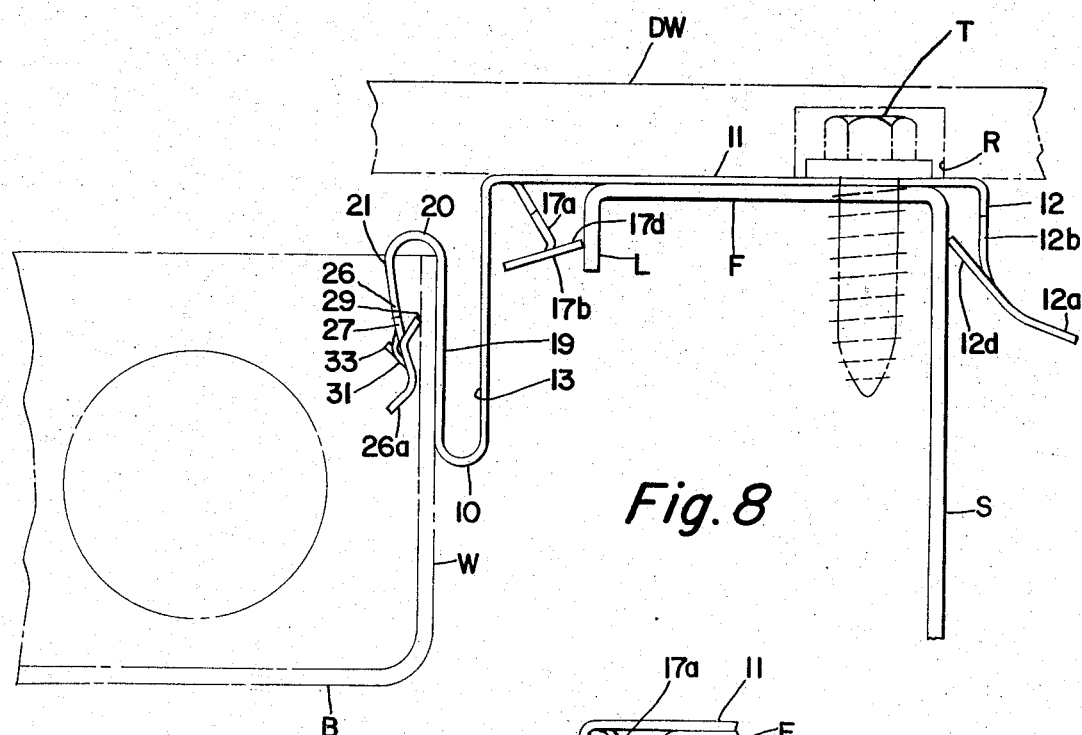
FIG. 8 is a view similar to FIG. 7, but showing another way in which the clip is attached to a metal stud.

In FIG. 8, the clip is applied to the stud by first applying the barbs or prongs 17c and 17d against the exterior surface of the lip L of the flange F, and then rocking the clip to a position such that the barbs or prongs 12d and 12e engage the exterior surface of the web of the stud. The manner in which the clip is thus secured is substantially the same as that described with reference to FIG. 7, so that the description of this need not be repeated.

Figure 9:
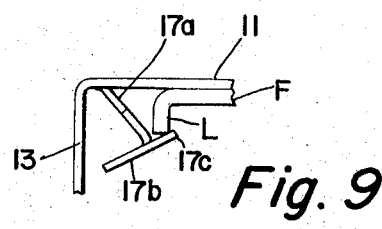
FIG. 9 is a fragmentary view, similar to FIG. 7, but showing the manner in which the clip may be attached to the metal stud, where the lip of the stud flange is relatively short.

In FIG. 9, a modification of the manner of connecting the clip to a stud is shown, which may be used in cases where the lip L of the flange F of the stud is relatively short, as compared with that shown in FIGS. 7 and 8. In this case, the barbs or prongs 17c and 17d may be utilized as hooks to engage the inner edge of the lip, so that the body 11 of the clip is locked to the flange of the stud by the resilience of the barbs or prongs. This manner of utilizing the barbs or prongs may be used in cases where the clip might be subjected to extreme abuse before the dry wall is installed.

It is thus seen that I have provided a clip of the character described, which has improvements incorporated therein designed to enable the clip to be firmly secured or attached to a metal stud, which has means incorporated therein for securing a ground wire thereto while eliminating extra lengths of wire, screws and extra clips, commonly used for grounding purposes; which embodies auxiliary means for securing the clip to a metal stud, whereby the conduit box cannot be removed accidentally from the stud by workmen passing through spaces between adjacent studs; which has added versatility, in that it may be used in several different ways to secure the conduit box to a metal stud, and which further embodies means for enabling the clip to be manipulated by a screwdriver for the purpose of assisting in securing the clip to the conduit box and metal stud.

It is to be understood that the forms of my invention, herewith shown and described, are to be taken as preferred examples of the same, and that various changes may be made in the shape, size and arrangement of parts thereof, without departing from the spirit of the invention or the scope of the subjoined claims.

Having thus described my invention, I claim:

1. In combination with a metal stud having a web and parallel spaced flanges provided with lips disposed in planes substantially parallel with said web, and an electrical conduit box having a side wall; means securing said conduit box to said stud, said means comprising a one-piece metal clip having a first portion in clamped engagement with said side wall, and a second portion in clamped engagement with a flange of said stud, said second portion having a body engaging the outer wall of said stud flange, a first flange spaced from said stud and having barbs engaging a portion of said stud, and a second flange spaced from said stud and having barbs extending from the central portion thereof and engaging a portion of said stud opposite said first named portion of the stud.

2. The combination, as defined in claim 1, wherein the first flange spaced from said stud has barbs engaging the exterior of one of the lips of said stud, and the second flange spaced from said stud has barbs which engage the exterior of the web of said stud.

3. The combination, as defined in claim 1, wherein the first flange spaced from said stud has barbs engaging the exterior of the web of said stud, and the second flange spaced from said stud has barbs which engage the exterior of one of the lips of said stud.

4. The combination, as defined in claim 1, wherein the first flange spaced from said stud has an ear portion extending therefrom angularly to said first flange and into the space between said first flange and said stud, and a second ear portion extending angularly to said first ear portion and provided with barbs.

5. The combination, as defined in claim 1, wherein said first portion of said clip has means thereon for clamping a ground wire thereto.

6. A clip for securing an electrical conduit box to the web, flange and lip of a channel-shaped stud, said clip comprising a first portion adapted for clamped engagement with a side wall of said box, and a second portion adapted for clamped engagement with said web, flange and lip of said stud, said second portion having a body, a first flange depending from one end of said body and having barbs adapted to engage said web or lip, and a second flange depending from said body and having an ear extending from the central portion thereof and provided with barbs adapted to engage said lip or web, said ear having a portion extending angularly downwardly into the space between the flanges of said second portion, and a second ear portion extending angularly to said first ear portion and having spaced barbs.

7. A clip, as defined in claim 6, wherein said first portion of the clip is provided with means for the clamped attachment thereto of a ground wire.

8. A clip, as defined in claim 7, wherein said last-named means comprises a flange having spaced flange portions, one of which has a recess therein for passage of a ground wire.

9. A clip, as defined in claim 6, wherein said body is provided with an opening for the passage therethrough of a screw.

10. A clip, as defined in claim 6, wherein an opening is provided in said ear adapted for reception of a tool, by means of which said last-named barbs may be moved away from said lip or web.

11. A clip for securing an electrical conduit box to the web, flange and lip of a channel stud, said clip comprising a first portion adapted for securement to said box, and a second portion adapted for securement to said stud, said first portion having means formed integrally therewith and adapted for the clamped engagement to said first portion of a ground wire, said means comprising spaced flanges and a flange disposed between said spaced flanges for resiliently clamping said ground wire to said spaced flanges.

12. A clip, as defined in claim 11, wherein said last-named flange has a portion of arcuate cross-section through which said ground wire may be passed.

13. A clip, as defined in claim 12, wherein said last-named flange is provided with an ear or tab adapted to be engaged by a screw driver to bias said last-named flange away from the plane of said spaced flanges.

14. A clip for securing an electrical conduit box to the web, flange and lip of a channel-shaped stud, said clip comprising a first portion for clamped engagement with a side wall of said box, said first portion comprising spaced flanges, one of which is resiliently biased toward the other and is provided with means for the clamped engagement thereto of a ground wire, and a second portion adapted for clamped engagement with said web, flange and lip of said stud, said second portion having a body, a first flange depending from said body and having barbs adapted to engage said web or lip, and a second flange depending from said body and provided with barbs adapted to engage said lip or web.

15. A clip, as defined in claim 14 wherein said resiliently biased flange comprises a portion against which said ground wire is adapted to be clamped, and another portion which is adapted to clamp the ground wire to said first portion of the resiliently biased flange.

16. A clip, as defined in claim 15, wherein said last-named portion of said resiliently biased flange has a recess of arcuate cross-section adapted to accommodate said ground wire.

17. A clip, as defined in claim 16, wherein said last-named portion of said resiliently-biased clamp is provided with an ear or tab stamped outwardly therefrom, whereby to provide between said last-named portion and said ear or tab a space adapted to receive a screwdriver, to which leverage may be applied to pry said last-named portion away from said first-named portion, to release said ground wire from said clamped engagement.

* * * * *